May 30, 1967     A. A. STERK ETAL     3,322,991

POINT RADIATION DETECTOR

Filed Oct. 18, 1963     2 Sheets-Sheet 1

INVENTORS
Andrew A. Sterk
P. William Zingaro
BY
ATTORNEYS

May 30, 1967 A. A. STERK ETAL 3,322,991
POINT RADIATION DETECTOR
Filed Oct. 18, 1963 2 Sheets-Sheet 2

INVENTORS
Andrew A. Sterk
BY P. William Zingaro

ATTORNEYS

United States Patent Office 3,322,991
Patented May 30, 1967

3,322,991
POINT RADIATION DETECTOR
Andrew A. Sterk, Arlington, Va., and Placido William Zingaro, Hartsdale, N.Y., assignors to Philips Electronics and Pharmaceutical Industries Corp., New York, N.Y., a corporation of Maryland
Filed Oct. 18, 1963, Ser. No. 317,311
7 Claims. (Cl. 313—93)

This invention relates to radiation detectors and particularly to those having proportional counter characteristics.

A radiation detector constructed according to the principles of this invention comprises a hollow tubular structure closed off at both ends by transverse walls one of which is permeable to the radiation that it is desired to detect. The other wall and the cylinder are conductive and form the cathode of the detector. The anode is in the form of a cylindrical rod that extends through an aperture in the center of the transverse wall portion of the cathode opposite the radiation-permeable wall. The tip of the anode is substantially hemispherical and the anode is insulated from the cathode by insulating means which also serve to seal the space between the aperture and the anode. In accordance with proportional counter techniques a rare gas is used to fill the volume within the detector. If desired, the radiation detector of this invention may be used as a flow counter by providing an opening for gas to flow into the detector and another opening for it to flow out again, rather than making the device as a sealed assembly.

The invention will be described in greater detail in connection with the following specification and the drawings in which.

Figure 1:
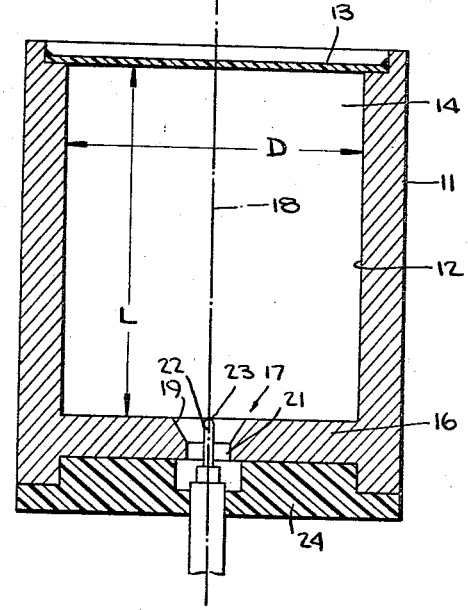
FIG. 1 is a cross-sectional view of the detector.

The detector in FIG. 1 comprises a hollow cylindrical body 11 of metal or of a non-conductive material having a conductive inner surface 12 with a diameter D. A radiation-permeable wall, or window, 13 is sealed gas-tight across the cylinder 11 to define one end of an enclosed volume 14. As shown in FIG. 1, the wall 13 is at one end of the cylinder 11 although, if desired, the cylinder may extend beyond this wall.

Another wall 16 is also sealed gas-tight to the cylinder 11 and is spaced from the first wall 13 by a distance L. This second wall may, in fact, be formed at the same time that the cylinder 11 itself is formed by boring out a solid bar or by any other convenient means. The wall 16 has a central aperture 17 which is concentric with the axis 18 of the cylinder 11. This aperture 17 may, if desired and as shown in FIG. 1, consist of a frusto-conical portion 19 the smaller end of which terminates in a cylindrical portion 21.

Located within the aperture 17 and concentric with the axis 18 is a cylindrical anode 22 having a substantially hemispherical end 23. The distance between the end 23 and the window 13 is given by the dimension L and the anode 22 is so located that its end 23 is substantially coplanar with the inner surface of the wall 16 or is slightly below this surface. The anode is supported by an insulating member 24 which is sealed to it and to the wall 16 and the cylinder 11 so as to enclose hermetically the space 14. This space is filled with a rare gas such as argon, neon, or xenon.

In determining the optimum size relationship of the detector and particularly the ratio of L/D, a detector having a diameter D of ½ inch was subjected to manganese radiation from a radioactive $Fe_{55}$ source, and measurements were made with varying lengths L from 7/16 inch to 11/16 inch and the results are shown in the graphs reproduced as FIGS. 2 through 5. In each of these graphs the abscissa of the curve is indicated as base line voltage which, in accordance with the standard terminology employed in connection with X-ray proportional counters, is a measure of the amplitude of voltage impulses at the anode 22 as a result of exposure to the radioactive material. The distance between the zero ordinate and the ordinate of any particular base line voltage is determined by the number of electrons reaching the anode 22 in any given time and having an energy equal to that particular base line voltage. As may be seen, each of the curves reaches at least one maximum point which is determined by the statistical average energy of the quanta emitted by the particular radioactive material under investigation. As a measure of the merit of proportional counters it is convenient to relate the energy, which is indicated as a certain base line voltage, at which the curve reaches its maximum point with the width of the curve, also expressed as a number of base line volts, at a level equal to one half of the maximum level.

Figure 2:
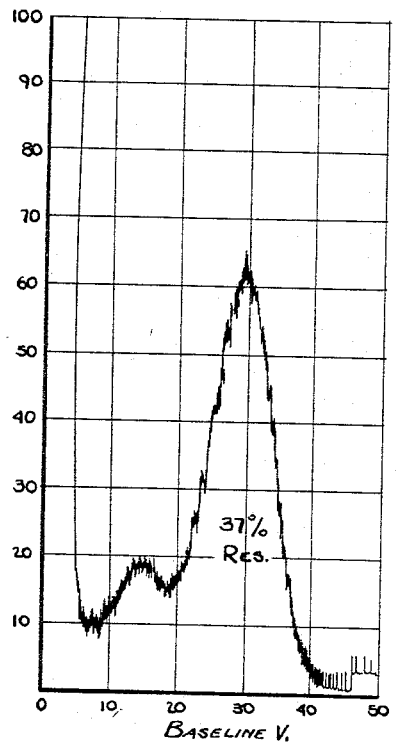
FIGS. 2 through 5 are curves of output signals derived from the detector of FIG. 1, each of these curves being derived from a detector having certain physical size relationship.
Figure 6:
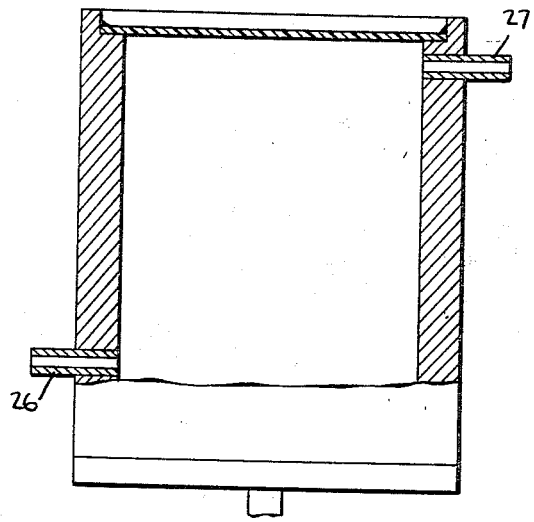
FIG. 6 shows the detector of FIG. 1 arranged as a flow counter.

In FIG. 2 the length L is 7/16 inch so that the ratio of L/D is .875. The highest vertical distance above zero reached by the curve is approximately 62 units and the width of the curve at one half of the maximum is approximately 11 base line volts. The maximum point of the curve is reached at a base line voltage of 29 volts; and dividing 11 volts by 29 volts gives a numerical result of .37, or 37%, which is spoken of as the resolution of the detector. The usage of the term "resolution" is to indicate the ability of the detector to distinguish between two radioactive materials having quanta of different energies, and, in particular, the resolution indicates how well the detector could indicate separately the existence of radioactive materials having quanta of relatively similar energy levels. A resolution of 37% indicates that the detector with an L/D ratio of 1875 could not separate quanta very well unless the energy levels of the quanta differed by about 37%. Consequently, if the quanta were emitted by chemical elements having adjacent locations in the periodic table of elements, this particular detector would not be able to indicate separately their existence.

Figure 3:
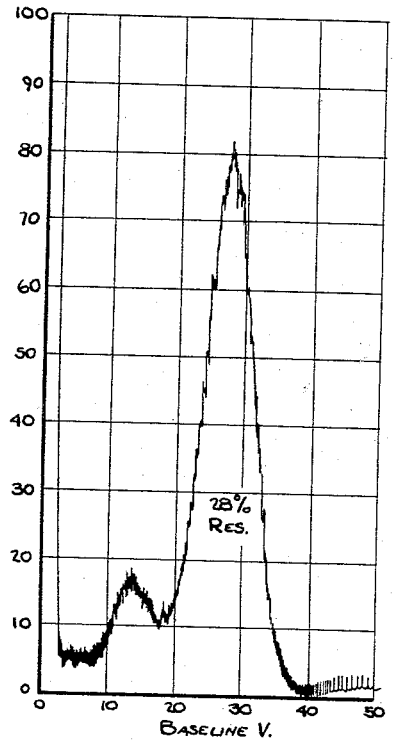

FIG. 3 shows a curve of a detector of the type described in connection with FIG. 1 but having an L/D ratio of 1.0. This means that the length of the detector between the walls 16 and 13 is approximately equal to the internal diameter of the cylinder 11. In FIG. 3 the peak value of the curve is at approximately 27.5 base line volts and the amplitude of the peak is about 80 units. The width of the curve at 40 units is about 8 base line volts and therefore the resolution is 8/27.5, or approximately 28%. A resolution of 28% is much better than a resolution of 37%, showing that a detector having an L/D of 1.0 is better able to separately identify quanta of different energy levels than is a detector having an L/D ratio of .875.

Figure 4:
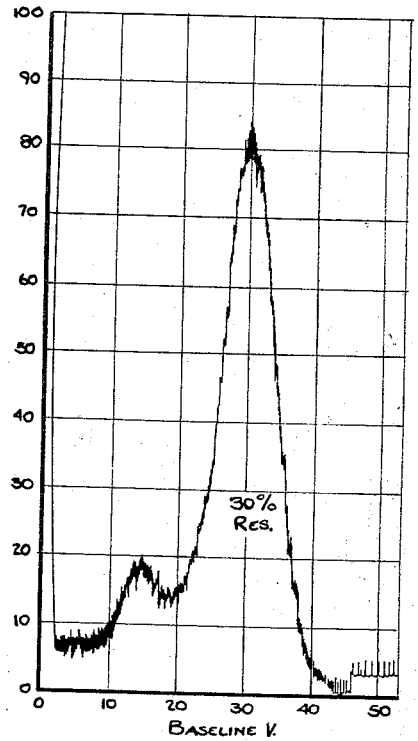

FIG. 4 shows a similar curve for a somewhat longer detector in which L was about 9/16 inch. The L/D ratio is therefore 1.125. The peak value of this curve is at approximately 30 base line volts and is at a level of approximately 80 units. At a level of 40 units, the width of the curve is approximately 9 base line volts; and the ratio of 9/30 gives a resolution of 30%, which is not as good as the resolution of a detector having an L/D ratio of 1.0.

Figure 5:
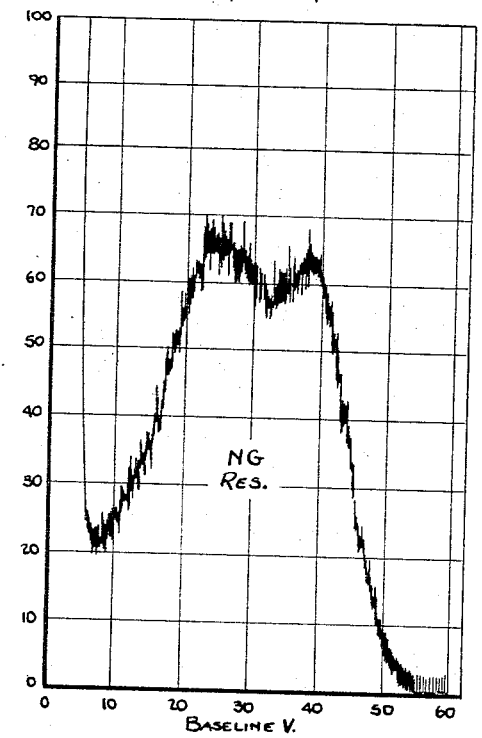

FIG. 5 shows the effect of increasing the length of the detector still more. In this figure the measurements are made on a detector having a length L of approximately 11/16 inch which means that the L/D ratio is approximately 1.375. This curve has not one but two peaks at levels of about 63 and 67 units. The peaks occur at approximately 25 and 38 base line volts and the width of the curve at approximately 34 units is almost 30 base line volts which means that the resolution is so bad as to make the detector useless from the point of view of seperating quanta of different energy levels; although the detector will, of course, operate to indicate the existence of radiation impinging upon it.

Reviewing the graphs of FIGS. 2 through 5 it is apparent that the optimum value of L/D is approximately 1.0. The resolution of 28% for such a detector is quite satisfactory, especially when it is considered that the detector has no end effects and that its entire volume is active, in contrast to prior detectors having inactive spaces at each end of the cylindrical volume to eliminate end effects. Because of the fact that the anode 22 is located only at one end of the detector, the device is more efficient in detecting radiation beams of round or square cross-section than is a detector in which the anode extends the full length of the cylinder and the radiation must enter through a window in the central part of the cylinder.

The detector may also be made as a flow counter by providing a small channel 26 leading into the side wall of the hollow cylindrical body 11 to permit a suitable rare gas such as argon, neon, or xenon to be introduced into the body 11. Another small channel 27 permits the gas to flow out again after it has accomplished its purpose within the body of the detector. The purpose of this flowing gas is the same as it is in other flow counter tubes, namely to remove released gas from the space within the detector body. This released gas comes from the inner surface of the body 11 and other interior surfaces within the detector and is gas that was occluded in these surfaces during or prior to the manufacture of the detector. The rate of flow of gas introduced into the channel 26 is very small, usually only a fraction of a cubic foot per hour.

While this invention has been described in terms of a specific embodiment, it will be recognized by those skilled in the arts that modifications may be made therein without departing from the scope thereof as measured by the following claims.

What is claimed is:

1. A proportional counter comprising a hollow conductive cylinder having an internal diameter D; a first, radiation-permeable wall across said cylinder; a second wall across said cylinder spaced from said first wall and having a central aperture therethrough; a cylindrical anode located in said aperture and concentric therewith and with said cylinder, said anode having a substantially hemispherical end facing the enclosed portion of said cylinder between said walls and spaced from said radiation-permeable wall by a distance substantially equal to the diameter D; insulating means sealing the space between said anode and said second wall; and rare gas filling the enclosed volume within said cylinder between said walls.

2. A proportional counter comprising a hollow conductive cylinder having an internal diameter D; a first, gas-tight, radiation-permeable wall across said cylinder; a second, gas-tight wall across said cylinder spaced from said first wall and having a central aperture therethrough; a cylindrical anode located in said aperture and concentric therewith and with said cylinder, said anode having a substantially hemispherical end facing the enclosed portion of said cylinder between said walls and spaced from said radiation-permeable wall by a distance substantially equal to the diameter D; insulating means sealing the space between said anode and said second wall; and rare gas filling the enclosed volume within said cylinder between said walls.

3. A proportional counter comprising a hollow conductive cylinder having an internal diameter D; a conductive wall sealed gas-tight to said cylinder to close off one end of a space within said cylinder; said wall having a central aperture therein on the axis of said cylinder; a second, radiation-permeable wall sealed gas-tight to said cylinder and spaced from said first wall by a distance substantially equal to the diameter D to cooperate therewith in enclosing a space within said cylinder; a cylindrical rod anode located within said aperture and substantially coaxial with said cylinder with the hemispherical end facing toward said second wall and substantially coplanar with the inner surface of said first wall; insulating means sealing the space between said anode and the perimeter of said aperture in said first wall; and a rare gas filling said enclosed space.

4. The proportional counter of claim 3 in which the hemispherical end of said anode is slightly below the level of the inner surface of said first wall.

5. The proportional counter of claim 3 in which said first wall has a conical depression forming a part of the perimeter of said aperture.

6. The proportional counter of claim 3 comprising in addition an entrance channel to the interior of said cylinder for connection to a source of said rare gas; and an exit channel also communicating with the interior of said cylinder to permit egress of said rare gas and released gas.

7. A proportional counter comprising a hollow metal cylinder having an internal diameter D; a first, metal wall extending across said cylinder, said wall having a cenrtal depression comprising a substantially frusto-conical portion in the center of said wall on the axis of said cylinder, and a substantially cylindrical tunnel through said wall, the diameter of said tunnel being equal to the diameter of the smaller end of said frusto-conical depression and being substantially concentric therewith; a second, gas-tight, radiation-permeable wall sealed to the inner wall of said cylinder and spaced from said first wall to form an enclosed volume; a cylindrical rod anode located within said tunnel and having a substantially hemispherical end facing said second wall and located slightly below the plane of the inner surface of said first wall and spaced from said radiation-permeable wall by a distance substantially equal to the diameter D; insulating means sealing the space between said anode and said first wall; and rare gas filling the enclosed volume bounded by said cylinder and said walls.

References Cited

UNITED STATES PATENTS

| | | | |
|---|---|---|---|
| 2,735,953 | 2/1956 | Tirico | 250—83.6 |
| 2,917,647 | 12/1959 | Fowler et al. | 313—93 |
| 2,933,610 | 4/1960 | Ress | 250—83.6 |
| 2,998,522 | 8/1961 | Martin et al. | 313—93 |
| 3,047,760 | 7/1962 | Hermsen et al. | 313—93 |

DAVID J. GALVIN, *Primary Examiner.*

UNITED STATES PATENT OFFICE

CERTIFICATE OF CORRECTION

Patent No. 3,322,991                                              May 30, 1967

Andrew A. Sterk et al.

It is hereby certified that error appears in the above numbered patent requiring correction and that the said Letters Patent should read as corrected below.

Column 2, line 41, for "1875" read -- .875 --.

Signed and sealed this 13th day of August 1968.

(SEAL)
Attest:

Edward M. Fletcher, Jr.                                  EDWARD J. BRENNER
Attesting Officer                                            Commissioner of Patents